(12) United States Patent
Magarkar et al.

(10) Patent No.: US 12,131,316 B2
(45) Date of Patent: Oct. 29, 2024

(54) SYSTEMS AND METHODS FOR REDUCING AUTHENTICATION NETWORK MESSAGING WITH UPDATED AUTHORIZATION REQUESTS

(71) Applicant: MASTERCARD INTERNATIONAL INCORPORATED, Purchase, NY (US)

(72) Inventors: Shivani Magarkar, Betul (IN); Gurpreet Atwal, Chesterfield, MO (US); Jaipal Singh Kumawat, Sikar (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 25 days.

(21) Appl. No.: 17/986,665

(22) Filed: Nov. 14, 2022

(65) Prior Publication Data
US 2024/0161093 A1    May 16, 2024

(51) Int. Cl.
*G06Q 40/00* (2023.01)
*G06Q 20/38* (2012.01)

(52) U.S. Cl.
CPC ................... *G06Q 20/382* (2013.01)

(58) Field of Classification Search
CPC .................................................... G06Q 20/382
See application file for complete search history.

(56) References Cited

U.S. PATENT DOCUMENTS 7,639,116 B2 * 12/2009 Saunders ............. G06Q 20/367
340/5.4
10,467,683 B2    11/2019 Raman
(Continued)

FOREIGN PATENT DOCUMENTS

AU    2016277629 A1 *  1/2017  ......... G06Q 20/3226

OTHER PUBLICATIONS

Yin et al: "An Anti-Quantum Transaction Authentication Approach in Blockchain", IEEE Journal of Solid-State Circuits (Year: 2018).*

*Primary Examiner* — Edward J Baird
(74) *Attorney, Agent, or Firm* — Armstrong Teasdale LLP

(57) ABSTRACT

A method for linking an initial authentication of an online transaction to a subsequent authorization of the online transaction is provided. The method includes: receiving an authentication request message including transaction data, storing in an authentication database authentication data including an initial transaction amount, causing margin data representative of an authentication margin to be associated with the authentication data in the authentication database, receiving a request to link an authorization request message for the online transaction to the authentication data wherein the authorization request message including a fulfillment transaction amount greater than the initial transaction amount, determining that the fulfillment transaction amount does not exceed the initial transaction amount by more than the authentication margin, and transmitting an indication that the authorization request message is successfully linked to the authentication data, thereby enabling authorization by the payment network of the online transaction including the fulfillment transaction amount.

14 Claims, 6 Drawing Sheets

(56) References Cited

U.S. PATENT DOCUMENTS

| | | |
|---|---|---|
| 10,528,945 B1 | 1/2020 | Renke et al. |
| 10,706,413 B2 | 7/2020 | Curry et al. |
| 2006/0136317 A1* | 6/2006 | Mizrah .................. G06Q 40/02 |
| | | 705/42 |
| 2012/0036073 A1 | 2/2012 | Basu et al. |
| 2016/0162677 A1* | 6/2016 | Kohlenberg ............ G06F 21/36 |
| | | 726/19 |
| 2016/0259306 A1* | 9/2016 | Pangrazio, III ....... H04L 9/3247 |
| 2018/0330382 A1* | 11/2018 | Chen .................... G06Q 20/382 |
| 2021/0192611 A1* | 6/2021 | Kothari ................. G06F 3/0482 |
| 2022/0210151 A1* | 6/2022 | Williams ............ H04L 63/0861 |
| 2023/0088260 A1* | 3/2023 | Banerjee ................ G06N 20/00 |
| | | 705/39 |

* cited by examiner

SYSTEMS AND METHODS FOR REDUCING AUTHENTICATION NETWORK MESSAGING WITH UPDATED AUTHORIZATION REQUESTS

BACKGROUND

The field of the disclosure relates generally to secure authentication of a network user, and, more particularly, to computer based systems and methods for mitigating a dynamic linking failure due to an intervening data parameter update.

In at least some known authentication systems, a financial entity (referred to as an issuer or issuer bank), that issues a payment account that may be used in an online transaction, may contract with an operator of an access control server (ACS) for authentication services. Specifically, in these cases, the ACS analyzes at least some of the data associated with the transaction, and in many cases, may send an electronic "step-up" challenge message (e.g., a challenge question, one-time password, or request for biometric authentication) to the account holder's computing device, determines a likelihood that the transaction was initiated by a legitimate user of the account, and reports that determination to the issuer. In a separate communication, the online merchant may transmit a request via a payment network for authorization of the purchase amount against the account, and if the account user is determined to be legitimate from the authentication message and the account is in good standing and has sufficient funds for the purchase, the issuer authorizes the transaction.

In some cases when consumers purchase items online, such as an order for a delivery of groceries, an initial purchase amount for the order increases when the order is fulfilled subsequent to the initial authentication and authorization. For example, some of the ordered items are not in stock at the time the merchant attempts to fulfill the order, and the consumer agrees to substitute a higher-priced item, or the weight of certain priced-by-weight items is slightly higher than the ordered weight. Other price increases may arise from shipping and miscellaneous charges, currency conversion, or other causes. In such cases, the merchant must send an updated authorization request via the payment network at the time the order is filled to authorize the increased amount. In at least some cases, the issuer may choose to decline (and in some jurisdictions, may be required to decline) to authorize a successfully authenticated, otherwise legitimate transaction due to the initial transaction amount, used in the authentication message when the order was placed, being exceeded by the increased transaction amount cited in the authorization request when the order is fulfilled. For example, in regions such as the European Economic Area, the United Kingdom, and India, regulations state that the final authorized transaction amount cannot be higher than the authenticated amount, although it may be lower than the authenticated amount. While such regulations may reduce fraud for card-not-present (CNP) transactions, they pose significant technical challenges for transactions where the final amount of the transaction is unknown at the time of authentication.

In order to try and prevent this problem, merchants may submit a second authentication request, which includes the increased transaction amount, to the ACS system prior to submitting the increased final amount via the payment network for authorization by the issuer. However, this second authentication process requires significant additional authentication messaging between the merchant and the ACS, between the ACS and the issuer, and between the ACS and the account holder. This additional series of messages creates a burden on the bandwidth of the ACS system and on the digital storage and record management resources of the ACS, the payment network, and/or the issuer. In addition, unlike during the initial authentication, the account holder is not actively participating in the online purchase process during such a second authentication, and therefore the account holder may miss the step-up challenge sent to the account holder's computing device and cause the transaction to be declined. Yet, this second authentication process and additional series of messages adds no value to the authentication process itself, as nothing has changed with respect to the likelihood that the order was placed by the legitimate holder of the account. In other words, this is a message-linking problem in the architecture of the legacy network systems widely used for authentication (e.g., the 3-D Secure (3DS) Protocol owned by EMVCo.) and authorization (e.g., closed networks implementing messaging standards based on ISO 8583), rather than an issue of fraud mitigation.

Some merchants attempt to address this problem by pre-authorizing with the issuer, during the initial order, a predetermined marginal increase on the initial order amount. This pre-authorization also causes the initial authentication to be based on the marginally increased amount, and the initial authentication remains applicable as long as the actual increased price submitted to the issuer for authorization at fulfillment does not exceed the pre-authorized margin. However, pre-authorization creates a separate problem, in that the pre-authorization causes the issuer to block funds in the account, including the full increased margin amount, until the issuer is informed of the exact final amount when the order is fulfilled. Accordingly, each preauthorization deprives the account holder of access to the increased marginal funds for a period of time, which may be several days, until the order is fulfilled. Thus, preauthorization may be an unacceptable solution for many account holders and issuers.

Accordingly, it is desirable to have a computer-implemented authentication platform that addresses the linking problem with the authorization system when the final authorized amount increases over the initial order amount.

BRIEF DESCRIPTION OF THE DISCLOSURE

In one aspect, a computer-implemented method for linking an initial authentication of an online transaction to a subsequent authorization of the online transaction is provided. The method is implemented by an authentication system including at least one processor in communication with a memory device. The method comprising steps performed by the at least one processor. The steps include receiving, from a requestor server in communication with a merchant platform in response to initiation of the online transaction by a consumer on the merchant platform, an authentication request message including transaction data, the transaction data including an initial transaction amount and an identifier of a proffered payment account; in response to an authentication of the consumer as a legitimate holder of the proffered payment account, storing, in an authentication database, authentication data including the initial transaction amount; causing margin data representative of an authentication margin to be associated with the authentication data in the authentication database; receiving, from a payment network, a request to link an authorization request message for the online transaction to the authentication data, the authorization request message including a fulfillment transaction amount greater than the initial transaction amount; determining that the fulfillment transaction amount does not exceed the initial transaction amount in the retrieved authentication data by more than the authentication margin; and transmitting, to the payment network in response to the determining, an indication that the authorization request message is successfully linked to the authentication data, thereby enabling authorization by the payment network of the online transaction including the fulfillment transaction amount.

In another aspect, a computing system in communication with an authentication platform for linking an initial authentication of an online transaction to a subsequent authorization of the online transaction is provided. The computing system includes at least one processor in communication with a memory device. The computing system is configured to: receive, from a requestor server in communication with a merchant platform in response to initiation of the online transaction by a consumer on the merchant platform, an authentication request message including transaction data, the transaction data including an initial transaction amount and an identifier of a proffered payment account; store, by the memory device, in response to an authentication of the consumer as a legitimate holder of the proffered payment account, in an authentication database, authentication data including the initial transaction amount; cause, by the at least one processor, margin data representative of an authentication margin to be associated with the authentication data in the authentication database; receive, from a payment network, a request to link an authorization request message for the online transaction to the authentication data, the authorization request message including a fulfillment transaction amount greater than the initial transaction amount; determine that the fulfillment transaction amount does not exceed the initial transaction amount in the retrieved authentication data by more than the authentication margin; and transmit, to the payment network in response to the determination of the fulfillment transaction amount, an indication that the authorization request message is successfully linked to the authentication data, thereby enabling authorization by the payment network of the online transaction including the fulfillment transaction amount.

In another aspect, a non-transitory computer-readable storage media having computer-executable instructions embodied thereon for linking an initial authentication of an online transaction to a subsequent authorization of the online transaction is provided. Wherein when executed by at least one computing device, the computer-executable instructions cause the processor to: receive, from a requestor server in communication with a merchant platform in response to initiation of the online transaction by a consumer on the merchant platform, an authentication request message including transaction data, the transaction data including an initial transaction amount and an identifier of a proffered payment account; store, by the memory device, in response to an authentication of the consumer as a legitimate holder of the proffered payment account, in an authentication database, authentication data including the initial transaction amount; cause, by the at least one processor, margin data representative of an authentication margin to be associated with the authentication data in the authentication database; receive, from a payment network, a request to link an authorization request message for the online transaction to the authentication data, the authorization request message including a fulfillment transaction amount greater than the initial transaction amount; determine that the fulfillment transaction amount does not exceed the initial transaction amount in the retrieved authentication data by more than the authentication margin; and transmit, to the payment network in response to the determination of the fulfillment transaction amount, an indication that the authorization request message is successfully linked to the authentication data, thereby enabling authorization by the payment network of the online transaction including the fulfillment transaction amount.

BRIEF DESCRIPTION OF THE DRAWINGS

FIG. 1 is a schematic diagram illustrating an example authentication system and an example authorization system.

FIG. 2 is an example screen of an example user interface for a consumer computing device for use with the authentication system shown in FIG. 1.

FIG. 3 is another example screen of the user interface shown in FIG. 2.

FIG. 4 is an example computing system architecture that may be used to implement the consumer computing device shown in FIG. 2.

FIG. 5 is another example computing system architecture that may be used to implement one or more of the computing devices shown in FIG. 1.

FIG. 6 is a flow diagram of an example method for authenticating an online user on behalf of an access control server (ACS).

Figure 1:
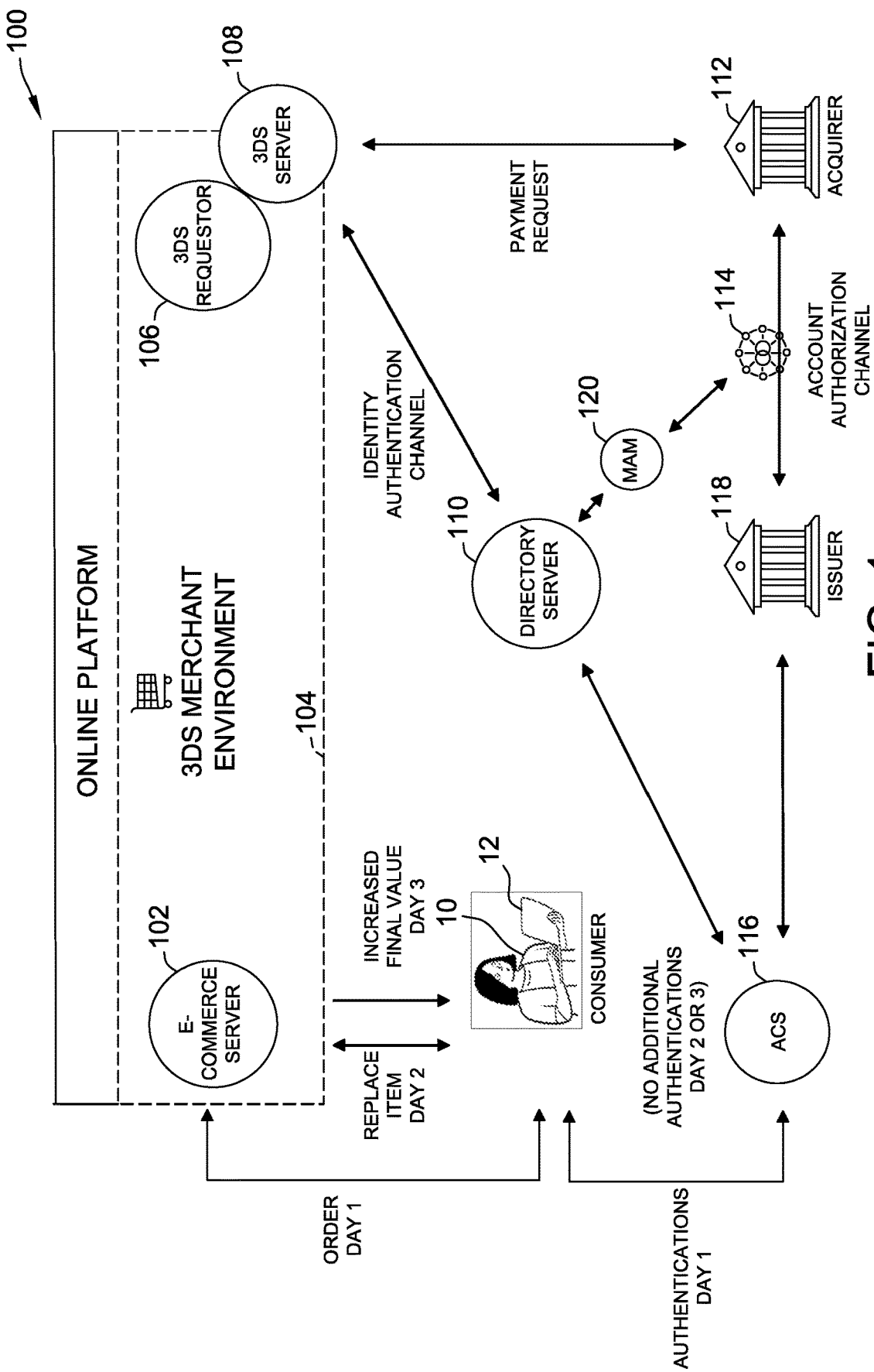
FIGS. 1-6 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The systems and methods described herein are directed to a margin authentication (MA) module implemented by an authentication platform to enable successful authorization when a merchant fulfills an order, despite an increase in a purchase price over the originally authorized amount at the time the order was placed. Specifically, in the systems and methods described herein, the authentication system uses the 3DS 2 Protocol (or subsequent versions of the 3DS Protocol) for authentication of an online consumer. When a consumer initiates an online purchase at a merchant platform, a directory server receives an authentication request (AReq) message including transaction data for the transaction from a 3DS server connected to the merchant platform. The directory server queries a directory on consumer account data in the AReq message to identify which access control server (ACS) should be used for authentication of the consumer account, and forwards the AReq message to the identified ACS. The ACS authenticates the transaction and transmits an authentication response (ARes) message indicating a successful authentication to the 3DS server, which informs the merchant platform. The authentication data for the initial purchase is also stored (e.g., by one or more of the directory server, the ACS, the issuer, or the payment network), to enable an issuer of the consumer's payment account to confirm the purchase was authenticated before authorizing payment for the transaction from the consumer's account. In response to the successful authentication, at least one of the 3DS server or the merchant platform initiates the authorization process with the issuer of the consumer's payment account for the initial purchase price. The issuer places a hold on the consumer's payment account equal to the amount of the initial purchase price, awaiting fulfillment of the order by the merchant.

In example embodiments described herein, the MA module is implemented at the directory server. Alternatively, the MA module is implemented at the ACS, cooperatively between the ACS and the directory server, and/or at any suitable computing device in communication with the authentication platform. If the consumer chooses to apply a margin to the authentication, the MA module causes data representative of the margin to be stored along with the other authentication data for use by the issuer and/or payment network to enable a link to a subsequent authorization of an increased purchase amount. In some embodiments, the margin data is included in the ARes message, so that the merchant platform is made aware of the margin authentication.

The MA module enables transactions that are ultimately fulfilled at an increased purchase amount to be authorized without a second authentication challenge to the consumer, so long as the increased amount does not exceed a predefined margin over the purchase price that was set at the time of the initial order with the merchant. In some embodiments, the MA module enables the consumer to define a particular margin value to be applied for the transaction (e.g., a 10% authentication margin enables the fulfilled transaction to be authorized if the fulfillment price does not exceed the initial purchase price by more than 10%). In certain embodiments, the MA module suggests a default margin to the consumer for use with a particular merchant, based on price changes observed by the ACS system for previous transactions with the particular merchant. Additionally or alternatively, the MA module enables the consumer to set and store a respective default margin for use with each particular online merchant. For example, the consumer may set a 10% margin (or, alternatively, a specific currency amount, e.g., ten dollars) for application to purchases from an online grocer, where the final order price may be expected to vary, and also set a zero margin for other merchants where no price variation is expected. Alternatively, the consumer may set a global default margin for application to all of the consumer's on-line purchases.

In example embodiments, the margin for a particular purchase is selected or confirmed by the consumer during the authentication process for the initial purchase. In some embodiments, a user interface is presented on the consumer's computing device during authentication of the initial purchase transaction (e.g., to prompt the consumer to enter a one-time password texted to the consumer's telephone number, answer a challenge question, or perform a biometric scan). The user interface also presents the consumer with an option to select or confirm margin authentication, and to set the amount of the margin by percentage (e.g., percentage over the initial purchase amount) or currency amount. The MA module then stores data representative of the consumer's margin selection. In some embodiments, the stored margin data includes a first margin data field indicating whether no margin, a percentage-based margin, or a currency-based margin applies to the transaction, and a second margin data field indicating the applicable percentage or currency amount to be applied if the value in the first data field so indicates. Alternatively, if the MA module is configured to implement only one of percentage-based or currency-based margins, the stored margin data may include only a single data field to implement the margin, with a zero value indicating that no margin applies and a non-zero value indicating the amount of the margin. In other embodiments, the stored margin data includes any suitable number and/or type of data fields to implement the margin.

Upon fulfillment of the order by the merchant, if the purchase amount has increased as discussed above, the merchant submits a second authorization request via the payment network to the issuer for authorization of the increased amount. At least one of the payment network server or the issuer server uses data in the second authorization request (e.g., consumer account identifier, merchant identifier, transaction identifier) to retrieve the stored authentication data for the transaction, and compares other data in the second authorization request to the stored authentication data as part of a linking process to determine if the second authorization request should be accepted or declined. In a conventional system, the increase of the purchase price, relative to the initial purchase price in the stored authentication data, would prevent the linking of the second authorization request to the previously completed authentication, which would cause the authorization of the increased amount to be declined, forcing the merchant to request a second authentication through the ACS in connection with the increased purchase amount. As noted above, this repeat or duplicate authentication of the already authenticated interaction between the consumer and the merchant for the same purchase causes a significant and unnecessary burden on the bandwidth of the authentication platform. Moreover, unlike the initial purchase, the consumer is not online interacting with the merchant at this time and may be unaware of or unable to respond to the second authentication process in a timely fashion, which may cause cancellation of the transaction. However, in contrast to the conventional system, the margin data, included in the stored authentication data by the MA module, enables the second authorization request to be linked to the original authentication, avoiding a repeat of the authentication process, so long as the increased amount does not exceed the margin established by the margin data.

The technical problems addressed by the authentication platform including the MA module and associated methods of the disclosure include at least one of: (i) significant and unnecessary burden on the bandwidth of the authentication platform caused by a duplicate authentication process when a second authorization request at order fulfillment cannot be linked to previously stored authentication data from order initiation; (ii) unavailability of a consumer to respond to messages to the consumer's computing device as part of a duplicate authentication process when a second authorization request at order fulfillment cannot be linked to previously stored authentication data from order initiation; (iii) inability for a consumer to input and save preferences with regard to the consumer's willingness to authenticate price increases within a specified margin; and (iv) inability of a payment network and/or an institution holding an account involved in an online transaction to mitigate an inability to link a second authorization request at order fulfillment to previously stored authentication data from order initiation.

A technical effect of the authentication platform including the MA module and associated methods of the disclosure include is achieved by steps including one or more of: (i) receiving, from a requestor server in communication with a merchant platform in response to initiation of the online transaction by a consumer on the merchant platform, an authentication request message including transaction data, the transaction data including an initial transaction amount and an identifier of a proffered payment account; (ii) in response to an authentication of the consumer as a legitimate holder of the proffered payment account, storing, in an authentication database, authentication data including the initial transaction amount; (iii) causing margin data representative of an authentication margin to be associated with the authentication data in the authentication database; (iv) receiving, from a payment network, a request to link an authorization request message for the online transaction to the authentication data, the authorization request message including a fulfillment transaction amount greater than the initial transaction amount; (v) determining that the fulfillment transaction amount does not exceed the initial transaction amount in the retrieved authentication data by more than the authentication margin; and (vi) transmitting, to the payment network in response to the determining, an indication that the authorization request message is successfully linked to the authentication data, thereby enabling authorization by the payment network of the online transaction including the fulfillment transaction amount.

A technical effect of the authentication platform including the MA module and associated methods of the disclosure include at least one of: (i) reduction or elimination of the significant and unnecessary burden on the bandwidth of the authentication platform caused by a duplicate authentication process when a second authorization request at order fulfillment cannot be linked to previously stored authentication data from order initiation; (ii) removal of the need for a consumer to respond to messages to the consumer's computing device as part of a duplicate authentication process when a second authorization request at order fulfillment cannot be linked to previously stored authentication data from order initiation; (iii) ability for a consumer to input and save preferences with regard to the consumer's willingness to authenticate price increases within a specified margin; and (iv) ability of a payment network and/or an institution holding an account involved in an online transaction to automatically mitigate an inability to link a second authorization request at order fulfillment to previously stored authentication data from order initiation.

As will be appreciated, based on the description herein the technical improvement in the authentication system as described herein is a computer-based solution to a technical deficiency or problem that is itself rooted in computer technology (e.g., the problem itself derives from the use of computer technology). More specifically, an unknown final transaction amount is a significant problem for transactions conducted over an electronic payment network, especially for card-not-present transactions. Advanced second authentication or preauthorization with a business margin methodologies exist, but at least some ACSs are unable to execute those methodologies and furthermore communication with ACSs increases network traffic and processing load, and in addition the ACS may be unavailable. Accordingly, to address this problem, the systems and methods described herein address this technical problem by using an MA module that causes data representative of the margin to be stored along with the other authentication data for use by the issuer and/or payment network to enable a link to a subsequent authorization of an increased purchase amount. Upon fulfillment of the order by the merchant, if the purchase amount has increased, the merchant submits a second authorization request via the payment network to the issuer for authorization of the increased amount. The data in the second authorization request is used to retrieve the stored authentication data for the transaction, and compares other data in the second authorization request to the stored authentication data as part of a linking process to determine if the second authorization request should be accepted or declined. This is accomplished without further input from the consumer.

The following detailed description of the embodiments of the disclosure refers to the accompanying drawings. The same reference numbers in different drawings may identify the same or similar elements. Also, the following detailed description does not limit the claims.

Described herein are computer systems such as authentication computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a non-transitory computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "payment account" includes payment card accounts, bank accounts, stored valued accounts, mobile wallets, etc., and "payment card" refers to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), wearable computing devices, key fobs, and/or any other computing devices capable of providing account information. Moreover, "payment cards" are not limited to physical devices but rather refer generally to payment credentials. In addition, consumer account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to authenticating users for transactions conducted over an electronic payment network.

FIG. 1 is a schematic diagram illustrating messaging flow of a transaction in an example authentication system 100 that uses the 3DS 2 Protocol (or subsequent versions of the 3DS 2 Protocol, for example versions 2.0, 2.1, 2.2, and subsequent versions of the 3DS Protocol). Information regarding the 3DS Protocol, including the current version of the protocol, can be found at https://www.emvco.com. The 3DS Protocols are owned and updated by EMVCo.

Authentication system 100 includes a directory server 110 that facilitates authenticating a consumer 10 who proffers a payment account for a purchase from an e-commerce server 102 on a merchant's online platform 104. For example, consumer 10 initiates a purchase transaction (e.g., an online transaction) on a consumer computing device 12 operated by the consumer, such as, for example, a mobile computing device, a smartphone, tablet, laptop, or the like. E-commerce server 102 may be a server that provides basic functions of an online storefront, such as a shopping cart. In some embodiments, e-commerce server 102 is a part of merchant website. E-commerce server 102 collects, from the consumer computing device 12, information necessary to authenticate the consumer 10 as a legitimate user of the proffered payment account using the 3DS 2 Protocol, including the authentication data. In example embodiments, this authentication data includes both "form" data, i.e., data that the consumer 10 actively fills in to make the purchase, and "scraped" data, which is automatically culled from consumer computing device 12 during interactions between consumer computing device 12 and merchant platform 104 (e.g., by machine-executed instructions embedded in merchant platform 104). For example, scraped data may include device details and browser details including device ID, IP address, device channel, and the like.

E-commerce server 102 transmits, via a 3DS requestor 106 implemented on the merchant platform 104, the collected information to a 3DS server 108 for inclusion in an authentication request message, also referred to herein as an AReq message. 3DS requestor 106 may be implemented on a smartphone, tablet, laptop, or the like, operated by the merchant. Merchant platform 104 and 3DS server 108 may communicate with one another, for example, using application programming interfaces (APIs) or browser interactions. In some embodiments, 3DS server 108 is similar to a data gathering device. 3DS requestor 106 and 3DS server 108 can connect to back end platforms, e.g., servers, storage, server farms or data centers. When generating the AReq message, 3DS server 108 formats the data for security purposes.

In example embodiments, 3DS server 108 determines which directory server 110 to transmit the AReq message to by identifying a payment processor 114 associated with the payment account proffered for the transaction. That is, different payment processors 114 will generally have different directory servers 110 for processing transactions. In turn, directory server 110 identifies an appropriate access control server (ACS) 116 associated with an issuer of the payment account. Directory server 110 forwards the AReq message to the identified ACS 116.

In response to the AReq message, ACS 116 performs authentication operations on behalf of the issuer. For example, ACS 116 is in communication with an issuer computing device 118 operated by, or on behalf of, the issuer. In example embodiments, if ACS 116 determines that a step-up challenge is required to authenticate the consumer 10 as a legitimate holder of the payment account, ACS 116 initiates a step-up challenge request in accordance with methods previously selected by the issuer (e.g., one or more of a biometric authentication, a one-time password (OTP) authentication, a short message service (SMS) authentication, a challenge question, or the like). ACS 116 transmits the challenge to a computing device of the legitimate holder of the proffered payment account, using contact information that the legitimate holder previously provided to the issuer of the payment account (e.g., a phone number, an email address, a digital wallet identifier). The computing device of the legitimate holder may correspond to consumer computing device 12 used to interact with merchant platform 104, or may be a different computing device controlled by the legitimate holder.

Figure 2:
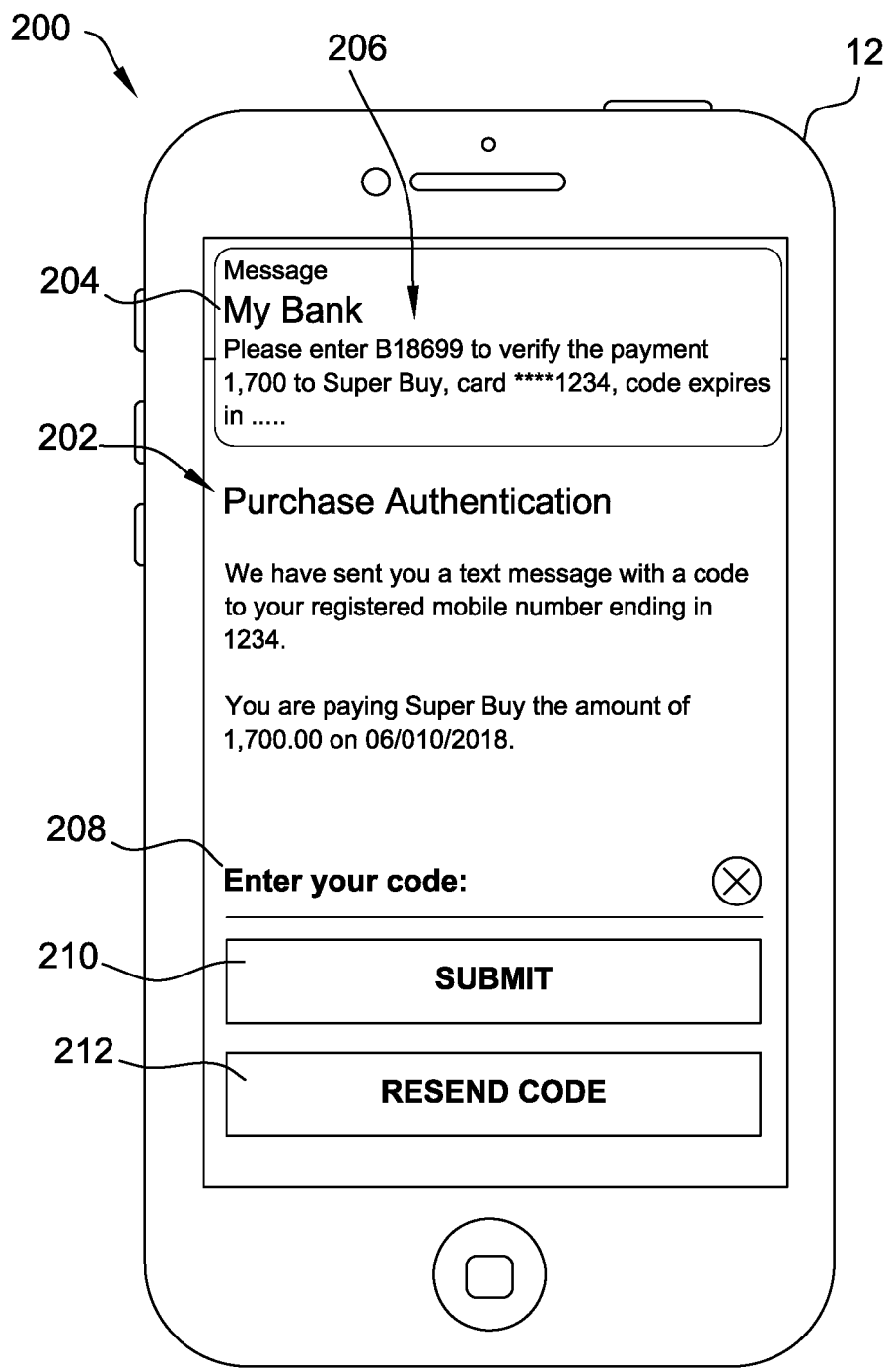

FIG. 2 is an example screen 202 of an example user interface 200 for a consumer computing device, such as consumer computing device 12, for use with authentication system 100. With reference to FIGS. 1 and 2, user interface 200 may be presented via an app or website served by e-commerce server 102 in response to consumer 10 initiating a payment for a purchase on e-commerce server 102. For example, user interface 200 may include frames embedded in the merchant's online shopping interface by 3DS requestor 106, or user interface 200 may otherwise be configured to communicate authentication data input by consumer 10 to 3DS requestor 106. In the illustrated example, ACS 116 transmits a one-time password 206 via an SMS text message 204 to a phone number of record provided by the issuer for the proffered payment account. User interface 200 prompts consumer 10 to enter the transmitted one-time password 206 in a data entry field 208 to confirm that consumer 10 is in possession of the phone number of record, which in this example corresponds to a mobile phone also being used as consumer computing device 12. Alternatively, consumer computing device 12 used to make the purchase from e-commerce server 102 may be a computing device other than the one contacted by ACS 116. After consumer 10 enters the code transmitted by ACS 116 in data entry field 208 and selects a "submit" control 210 to submit the entered code to merchant platform 104, merchant platform 104 compares the entered code to the code forwarded directly by ACS 116 through directory server 110, or alternatively merchant platform 104 forwards the entered code to directory server 110 to enable the comparison to be performed at directory server 110 or ACS 116. The results of the comparison are stored by one or more of merchant platform 104, directory server 110, and ACS 116. If the consumer 10 does not receive the SMS text message 204 or mis-types the code in data entry field 208, a resend control 212 enables the consumer to request a new code to be resent.

Although the illustrated embodiment describes the use of a one-time password, it should be apparent to those of ordinary skill that other authentication methods, such as a challenge question (e.g., mother's maiden name?), a biometric scan, or the like, may also be implemented by ACS 116 via user interface 200.

After the authentication process is complete (e.g., after the 3DS Protocol is finished), and if the consumer 10 is successfully authenticated, payment authorization for the transaction is undertaken. That is, the authentication using the 3DS 2 Protocol (or subsequent versions of the 3DS Protocol) occurs before payment authorization for the transaction. Payment authorization occurs over a channel, referred to here as an account authorization channel or payment network 114, that is separate from the identity authentication channel established by directory server 110 and ACS 116.

For example, payment network 114 may be a payment card interchange network, such as the Mastercard® interchange network. (Mastercard is a registered trademark of Mastercard International Incorporated located in Purchase, New York). The Mastercard interchange network uses a set of proprietary communications standards promulgated by Mastercard International Incorporated for the exchange of financial transaction data and the settlement of funds between financial institutions that are members of Mastercard International Incorporated. Alternatively, payment network 114 is another payment card interchange network or another payment processing system.

Merchant platform 104 initiates payment authorization by transmitting (e.g., via 3DS server 108) a payment request including authorization data to the payment network 114. In example embodiments, merchant platform 104 has established an account with a financial institution that has established a relationship with payment network 114. This financial institution is usually called the "merchant bank" or the "acquiring bank" or simply "acquirer." In FIG. 1, the functions of the merchant bank are implemented by an acquirer computing device 112 operated by the acquirer or by a third-party acquirer processor acting on behalf of the acquirer. Merchant platform 104 transmits the payment request to acquirer computing device 112, which serves as a gateway to payment network 114 for merchant platform 104. In example embodiments, the payment request includes information that indicates a successful authentication occurred.

In response to the payment request, acquirer computing device 112 transmits an authorization request to the payment network 114. Payment network 114 maintains a server computing system or "switch" that implements the interchange network and is configured to efficiently route communications between acquirer computing devices 112 and issuer computing devices 118. In the example embodiment, payment network 114 is configured to process and route messages having a constrained format, such as ISO 8583 compliant messages and/or ISO 20022 compliant messages. As used herein, "ISO" refers to a series of standards approved by the International Organization for Standardization (ISO is a registered trademark of the International Organization for Standardization of Geneva, Switzerland). The constrained format defines acceptable message types, data element locations, and data element values. ISO 8583 compliant messages are constrained by the ISO 8583 standard which governs financial transaction card originated messages. ISO 20022 compliant messages are constrained by the ISO 20022 standard. For example, ISO 20022 compliant messages may include acceptor to issuer card messages (ATICA). In some embodiments, acquirer computing device 112 generates a properly formatted authorization request message for the transaction using the authorization data received in the payment request. In other embodiments, the payment request sent by the merchant platform 104 is already formatted according to the proprietary standard. In example embodiments, acquirer computing device 112 recognizes the indication in the payment request that a successful authentication of consumer 10 occurred, and includes that information in the formatted authorization request message. For example, a flag or code is set in a predefined data field of the authorization request message to indicate that a successful authentication occurred.

The server computing system of the payment network 114 processes the authorization request message. For example, based on the indication that a successful authentication occurred, payment network 114 may retrieve the authentication data previously stored by directory server 110 and compare data in the authorization request message to corresponding fields in the authentication data to confirm that the transaction was properly authenticated. After processing, payment network 114 routes the authorization request message to issuer computing device 118. Issuer computing device 118 determines whether the tendered account is in good standing and whether the purchase is covered by the available credit line or account balance of the tendered account.

In response to these determinations, issuer computing device 118 transmits an authorization response message to payment network 114, indicating whether the authorization request will be declined or accepted. Payment network 114 processes the authorization response message. If the request is accepted, payment network 114 assigns and stores a bank network reference number, such as the Banknet Reference Number used by Mastercard International Incorporated®, an authorization code, and/or other transaction identifiers that may be used to identify the transaction. Payment network 114 then routes the authorization response message to acquirer computing device 112.

Acquirer computing device 112 in turn transmits a message to merchant platform 104 indicating the decline or acceptance. Merchant platform 104 may then communicate electronically with consumer computing device 12 to permit or deny the purchase.

In conjunction with the authorization process described above, a clearing process is also implemented by payment network 114. During the clearing process, acquirer computing device 112 provides issuer computing device 118 with information relating to the purchase transaction. No money is exchanged during clearing. Clearing (also referred to as "first presentment") involves the exchange of data required to identify the consumer's account, such as the account number, expiration date of an associated payment card, billing address, amount of the sale, and/or other transaction identifiers that may be used to identify the transaction. Along with this data, banks in the United States also include the bank network reference number which identifies that specific transaction.

When a request for authorization is accepted, the available credit line or available account balance of the account is decreased. Normally, a charge is not posted immediately to a cardholder's account because bankcard associations, such as Mastercard International Incorporated®, have promulgated rules that do not allow a merchant to charge, or "capture," a transaction until goods are shipped or services are delivered. When the merchant 104 ships or delivers the goods or services, merchant platform 104 captures the transaction by, for example, appropriate data entry procedures on a merchant platform terminal or automated processes triggered, e.g., by a shipping or other fulfillment notification. If the consumer 10 cancels a transaction before it is captured, a "void" is generated. If the consumer 10 returns goods after the transaction has been captured, a "credit" is generated. After a transaction is captured, the transaction is settled between merchant platform 104, acquirer computing device 112, and issuer computing device 118. Settlement refers to the transfer of funds between the merchant's account, the acquirer, and the issuer related to the transaction. Usually, transactions are accumulated into a "batch," which is settled as a group.

In example embodiments, if the transaction amount at fulfillment has increased over the initial transaction amount when the order was placed, at fulfillment an additional authorization request message for the new, increased amount is submitted via payment network 114, and must be authorized by issuer computing device 118 as described above. As discussed previously, in a conventional system, such an additional authorization can fail, because the increased transaction amount in the authorization request message at fulfillment causes an inability of the system to link the authorization request message at fulfillment to the original authentication data generated when the consumer 10 placed the order.

In example embodiments, the architecture of authentication system 100 includes an unconventional element, a margin authentication (MA) module 120, that addresses this data linking problem. In example embodiments, MA module 120 is implemented by software executed at directory server 110. Alternatively, MA module 120 is implemented by software executed at ACS 116, cooperatively between ACS 116 and directory server 110, and/or at any suitable computing device in communication with authentication system 100. MA module 120 enables consumer 10 to specify or confirm, concurrently with the placement of the order on merchant platform 104, a particular margin value to be applied for the transaction. So long as the transaction amount at fulfillment has not increased beyond the specified margin value, MA module 120 links the authorization request message sent at fulfillment to the authentication data generated during placement of the order, enabling authorization of the transaction to proceed without another round of authentication messaging between merchant platform 104, ACS 116, and consumer 10.

For example, if consumer 10 selects or confirms a 10% authentication margin when the order is placed on merchant platform 104, MA module 120 retrieves and applies that margin when payment network 114 receives a subsequent authorization request message at fulfillment of the same transaction that includes an increased transaction amount. If MA module 120 determines that the transaction details (e.g., transaction identifier, merchant identifier, payment account number, order date) otherwise match and that the fulfillment transaction amount does not exceed the initial transaction amount included in the authentication data by more than 10%, then MA module 120 links the retrieved authentication data to the authorization request message submitted at fulfillment and instructs payment network 114 to add or maintain a data element in the authorization request message indicating successful authentication, despite the mismatch in the transaction amount at fulfillment.

Figure 3:
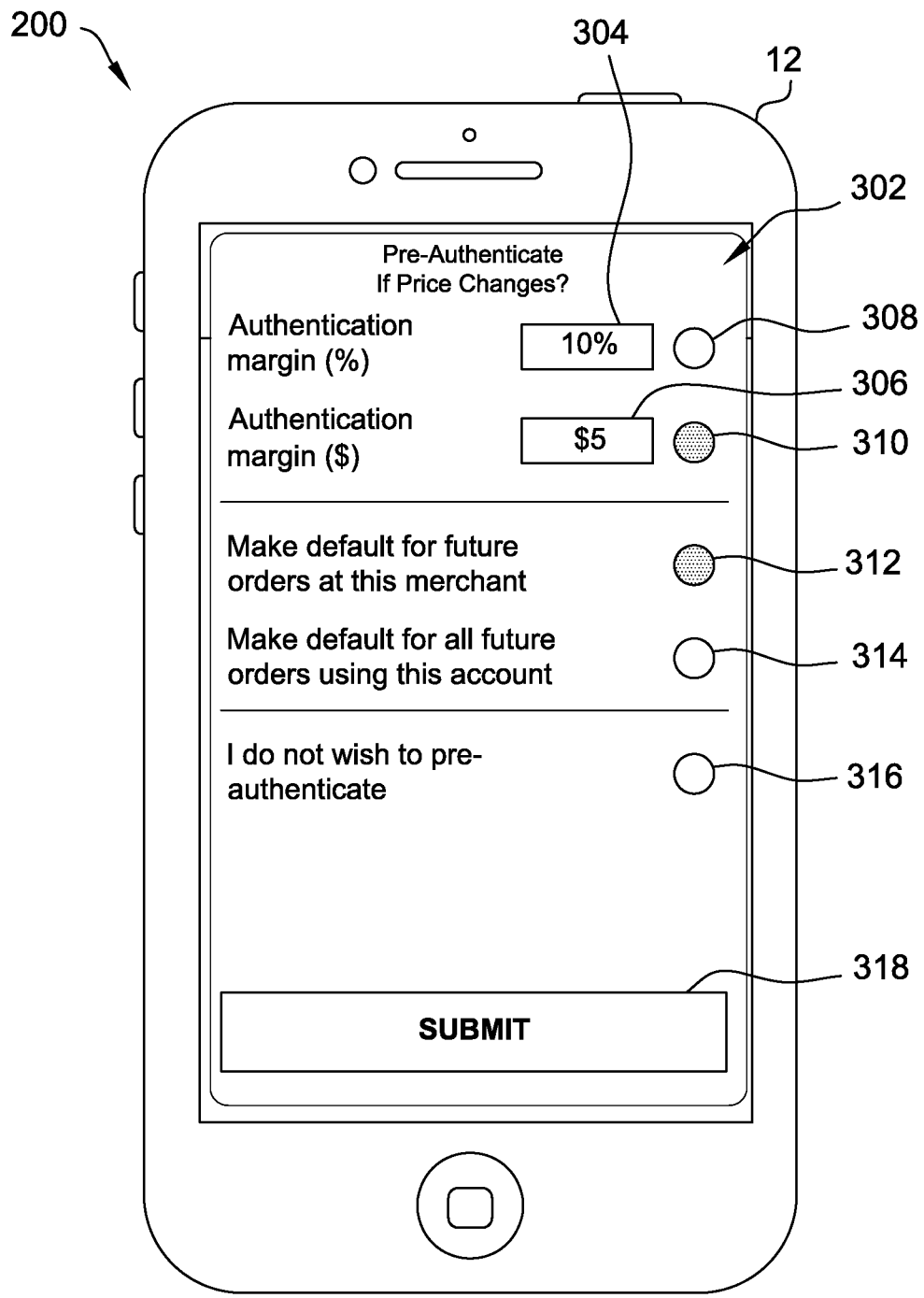

FIG. 3 is another example screen 302 of user interface 200. With reference to FIGS. 1 and 3, in example embodiments, during the authentication process for the initial purchase by consumer 10 using merchant platform 104, user interface 200 also presents the consumer with an option to select or confirm margin authentication, and to set the amount of the margin by percentage (e.g., percentage over the initial purchase amount) or currency amount. For example, user interface 200 causes screen 302 to appear after consumer 10 selects submit control 210 on screen 202 (shown in FIG. 2). In some embodiments, MA module 120 causes screen 302 to appear only when the transaction data is empirically associated (e.g., by comparison to historical transaction data stored by directory server 110 and/or payment network 114) with the data linking problem described above (e.g., when the merchant is of a merchant type associated with the data linking problem). Alternatively, MA module 120 is configured to enable margin authentication as suitable for any type of transaction or merchant.

Screen 302 includes selector buttons 308 and 310 to enable consumer 10 to select, respectively, a percentage-based or a currency-based margin. Screen 302 further includes data entry fields 304 and 306 to enable consumer 10 to enter a numeric value to be applied as, respectively, the percentage value or currency value of the margin. Alternatively, user interface 200 includes any suitable controls or fields to enable consumer 10 to select a margin to apply.

MA module 120 then causes data representative of the selected margin to be stored along with the other authentication data obtained during interaction of consumer 10 with merchant platform 104, for use in the linking process for an authorization request message at order fulfillment, as described above. In some embodiments, the margin data stored by MA module 120 includes a first margin data field indicating whether no margin, a percentage-based margin, or a currency-based margin applies to the transaction, and a second margin data field indicating the applicable percentage or currency amount to be applied if the value in the first data field so indicates. Alternatively, for example if MA module 120 is configured to implement only one of percentage-based or currency-based margins, the stored margin data may include only a single data field to implement the margin, with a zero value indicating that no margin applies and a non-zero value indicating the amount of the margin. In other embodiments, the stored margin data includes any suitable number and/or type of data fields to implement the margin.

In certain embodiments, MA module 120 communicates a default margin to user interface 200 for initial consideration by consumer 10. For example, the default value causes screen 302 to appear initially with percentage-based selector button 308 selected and a value of 10% in percentage data entry field 304. In some embodiments, MA module 120 selects the default values based on an analysis of authorization messages previously received by payment network 114 from merchant platform 104 that indicate an increased transaction amount at fulfillment of a previously authorized order. In other words, MA module 120 uses historical data for price increases at order fulfillment with a particular merchant platform to calculate the default margin as a value that can be expected to cover most instances of price increases that occur for subsequent transactions. MA module 120 may be programmed to retrieve historical data from payment network 114 and re-calculate such default margins on a periodic basis for merchant platforms 104, such as online grocers, that are subject to frequent price increases at order fulfillment.

Additionally or alternatively, MA module 120 enables consumer 10 to set and store a respective default margin for use with each particular merchant platform 104, or a global default margin for application to all of the consumer's on-line purchases. For example, screen 302 includes selector buttons 312 and 314 to able consumer 10 to apply a current margin value in an active one of data entry fields 304 and 306 as, respectively, a default merchant-specific or global margin value for use in populating screen 302 upon first display of screen 302 for future purposes. User application 200 may cause the selected default margin values to be stored on consumer computing device 12 (e.g., in a user profile for user application 200 or as a cookie).

In example embodiments, screen 302 also includes a selector button 316 to enable consumer 10 to apply no margin to a purchase if consumer 10 does not wish to pre-authenticate an increased price at order fulfillment. For example, the consumer may set a 10% margin (or, alternatively, a specific currency amount, e.g., five dollars) for application to purchases from merchant platform 104 of an online grocer, where the final order price may be expected to vary, and also to set no margin for merchant platforms 104 of other merchants where no price variation is expected.

After consumer 10 inputs values and selections as appropriate on screen 302, consumer 10 selects a "submit" control 318 that causes user interface 200 to submit the input information to MA module 120 and/or to store the input information on consumer computing device 12, as described above. In example embodiments, user interface 200 provides particular advantages when implemented on consumer computing device 12 implemented as a smart phone or the like having a limited display area and limited hardware keys/buttons, as user interface 200 enables consumer 10 to define and implement default margin values for a particular transaction, as well as all subsequent transactions with a particular merchant, directly in response to authentication of an initial order and without requiring consumer 10 to laboriously scroll through numerous screens to set up and activate the margin authentication feature.

Alternatively, user interface 200 includes any suitable structure and functionality that enables consumer 10 to select and/or confirm margin values to be stored by MA module 120 for the transaction.

Certain advantages of MA module 120 and user interface 200 may be demonstrated by the following non-limiting example use case. With reference to FIGS. 1-3, in the example use case, consumer 10, via consumer computing device 12, places an online order on day 1 with merchant platform 104 for a subsequent grocery delivery. In response to consumer 10 placing the order, directory server 110 receives an AReq message from 3DS server 108 including transaction data for the order, including an identifier of a payment account proffered by consumer 10 and an initial purchase amount of the order. Directory server 110 determines the ACS 116 used by the issuer of the proffered payment account, and forwards the AReq message to ACS 116. ACS 116 then contacts the consumer computing device (which may be consumer computing device 12 or another computing device controlled by the legitimate holder of the payment account) to prompt an authentication procedure, such as entry of a one-time password, by consumer 10 (e.g., using user interface 200). In addition, MA module 120, implemented for example at directory server 110 or alternatively at ACS 116 or merchant platform 104, determines that the transaction is suitable for margin authentication.

ACS 116 then analyzes the result of the authentication process to make an authentication decision. For example, ACS 116 may determine to fully authenticate the transaction, deny authentication for the transaction, or perform additional authentication (e.g., by issuing additional step-up challenges to consumer 10). If consumer 10 is suitably authenticated as a legitimate user of the proffered payment account, MA module 120 causes user interface 200 to present at least one margin authentication option to consumer 10 (e.g., using a screen similar to screen 302). Consumer 10 selects or confirms (e.g., a 10% margin authentication value), and MA module 120 causes the margin data to be stored in association with the other authentication data for the transaction.

On day 2, before the order of consumer 10 is completed for shipping, one of the items ordered by consumer 10 becomes out of stock. Either by default/prior consent, or after notification to and approval from consumer 10, merchant platform 104 replaces the out of stock item with a similar item of a larger quantity. Upon changing the item, the completed order will now have an increased transaction amount compared to the original transaction amount that was cited during authentication on day 1. In at least some conventional systems, merchant platform 104 would be required to initiate a new authentication process via directory server 110 and ACS 116 citing the increased transaction amount, despite the fact that the initial authentication already verified consumer 10 as the legitimate holder of the payment account. In other words, the bandwidth and computing resources of directory server 110, ACS 116, and the consumer's computing device would be devoted to another round of electronic network communication that would add no significant value to the authentication previously performed. In contrast, in the embodiments described herein, merchant platform 104 and/or directory server 110 applies the margin data caused to be stored by MA module 120 during the initial authentication, determines that the increased transaction amount does not exceed the margin, and avoids a second authentication process for the order.

When the order is fulfilled on day 3, a difference in a weight of a certain item priced by weight (e.g., vegetables) over the ordered weight causes another increase in the transaction amount. Again, in at least some conventional systems, merchant platform 104 would be required to initiate a new authentication process via directory server 110 and ACS 116 citing the increased transaction amount, despite the fact that the initial authentication already verified consumer 10 as the legitimate holder of the payment account, again needlessly co-opting the bandwidth and computing resources of directory server 110, ACS 116, and the consumer's computing device for another round of electronic network communication that would add no significant value to the authentication previously performed. In contrast, in the embodiments described herein, merchant platform 104 and/or directory server 110 again applies the margin data caused to be stored by MA module 120 during the initial authentication, determines that the newly increased transaction amount still does not exceed the margin, and avoids a second (or third) authentication process for the order.

Moreover, on day 3 consumer 10 was not watching for any notifications or messages on the consumer computing device 12, and had opted for a no-contact (e.g., leave on doorstep) delivery of the order. In at least some conventional systems, the fulfilled order would have to be cancelled due to an inability to perform a new authentication with consumer 10 for the increased transaction amount, resulting in inconvenience for the consumer and merchant. In contrast, in the embodiments described herein, the margin data caused to be stored by MA module 120 enables the fulfilled order to be completed as originally scheduled.

Notably, the example use case described above also illustrates advantages over conventional "preauthorization" models, in which the consumer's payment account is authorized over the payment network 114 on day 1 for an increased transaction amount. With preauthorization, a hold is placed on funds in the proffered account on day 1 for the full pre-authorized amount, such that consumer 10 has no ability to use those funds until after the order is fulfilled on day 3 at an amount less than the pre-authorized margin (e.g., at or closer to the original transaction amount). In other words, funds up to the full margin amount are blocked on the consumer's account until the issuer is informed of the exact final amount (and at the latest immediately after receipt of the payment order). In contrast, in the embodiments described herein, only funds equal to the original purchase amount are held on day 1, giving consumer 10 the full use of remaining funds in the proffered payment account unless and until the order is fulfilled at an increased amount.

Figure 4:
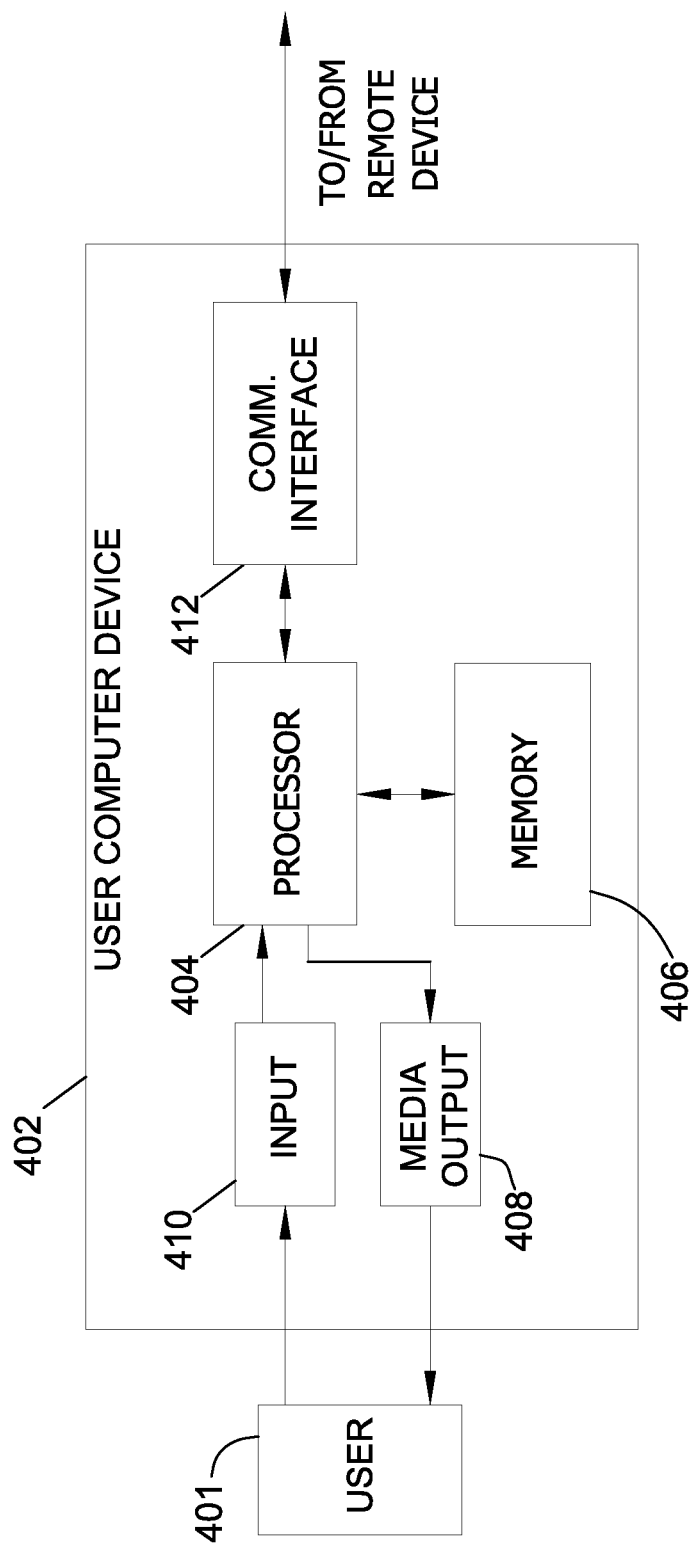

FIG. 4 illustrates an example architecture of a user computing system 402 that may be used to implement a consumer computing device, such as consumer computing device 12. In the example embodiment, user system 402 includes a processor 404 for executing instructions. In some embodiments, executable instructions are stored in a memory area 406. Processor 404 may include one or more processing units, for example, a multi-core configuration. Memory area 406 is any device allowing information such as executable instructions and/or other electronic data to be stored and retrieved. Memory area 406 may include one or more computer readable media.

User system 402 also includes at least one media output component 408 for presenting information to user 401. Media output component 408 is any component capable of conveying information to user 401. In some embodiments, media output component 408 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, user system 402 includes an input device 410 for receiving input from user 401. Input device 410 may include, for example, one or more of a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 408 and input device 410. User system 402 may also include a communication interface 412, which is communicatively countable to a remote device such as server system 501 (shown in FIG. 5). Communication interface 412 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 406 are, for example, computer readable instructions for providing a user interface, such as user interface 200, to user 401 via media output component 408 and, optionally, receiving and processing input from input device 410. A user interface may include, among other possibilities, a web browser and client application. Web browsers enable users, such as user 401, to display and interact with media and other information typically embedded on a web page or a website from server system 501. A client application allows user 401 to interact with a server application from server system 501. For example, user system 402 may enable user 401 to engage with a digital wallet application (not shown), merchant platform 104, ACS 116, or another suitable system, e.g., to perform a transaction and undergo an associated user authentication process.

Figure 5:
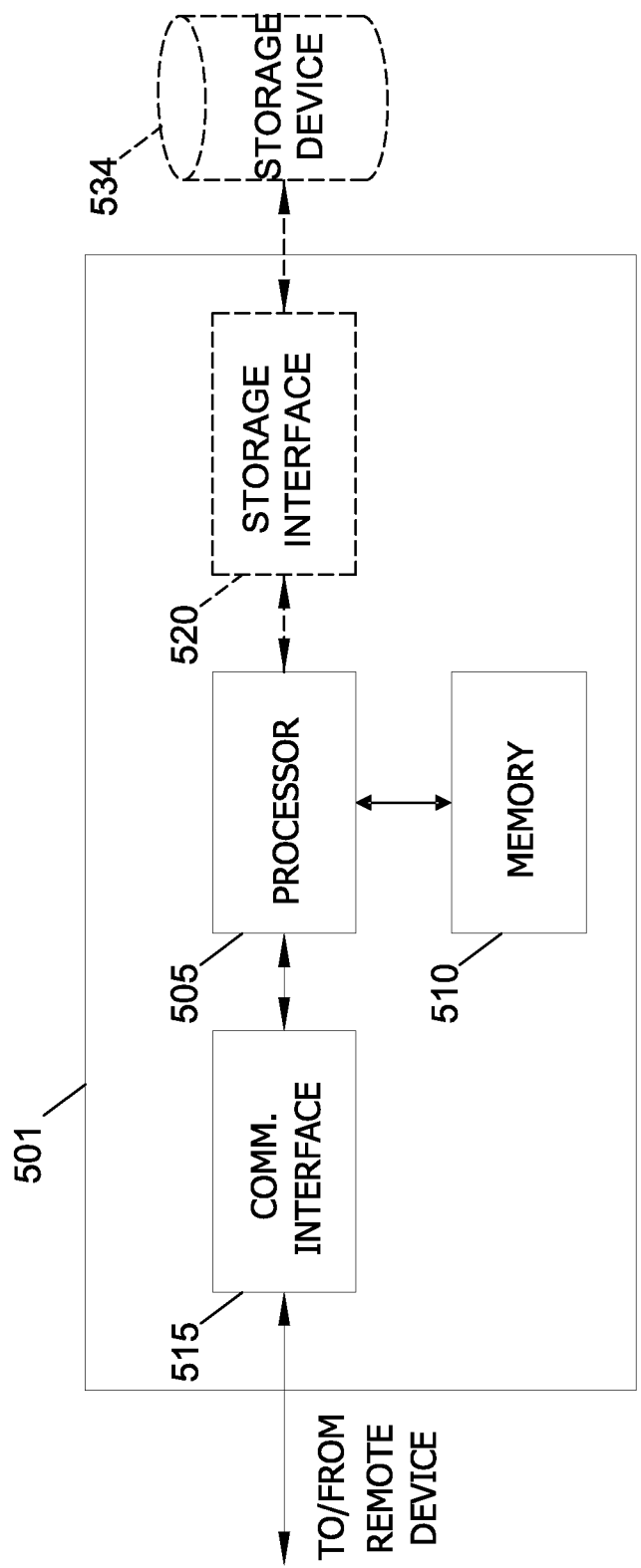

FIG. 5 illustrates another example architecture of a server computing system 501 that may be used to implement one or more of merchant platform 104, e-commerce server 102, 3DS requestor 106, 3DS server 108, directory server 110, acquirer computing device 112, payment network server 114, ACS 116, issuer computing device 118, or MA module 120 shown in FIG. 1. Server system 501 may implement, but is not limited to implementing, a database server, a web server, an application server, and/or an authentication service.

As shown in FIG. 5, server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that device 501 is capable of communicating with a remote device. For example, communication interface 515 may receive or transmit requests from an online platform or user device via the Internet.

Processor 505 may also be operatively coupled to a storage device 534. Storage device 534 is any computer-operated hardware suitable for storing and/or retrieving data, such as but not limited to historical transaction data for transactions authorized via payment network 114, authentication data (including margin data) for transactions authenticated via directory server 110, and the like. In some embodiments, storage device 534 is integrated in server system 501. For example, server system 501 may include one or more hard disk drives as storage device 534. In other embodiments, storage device 534 is external to server system 501 and may be accessed by a plurality of server systems. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
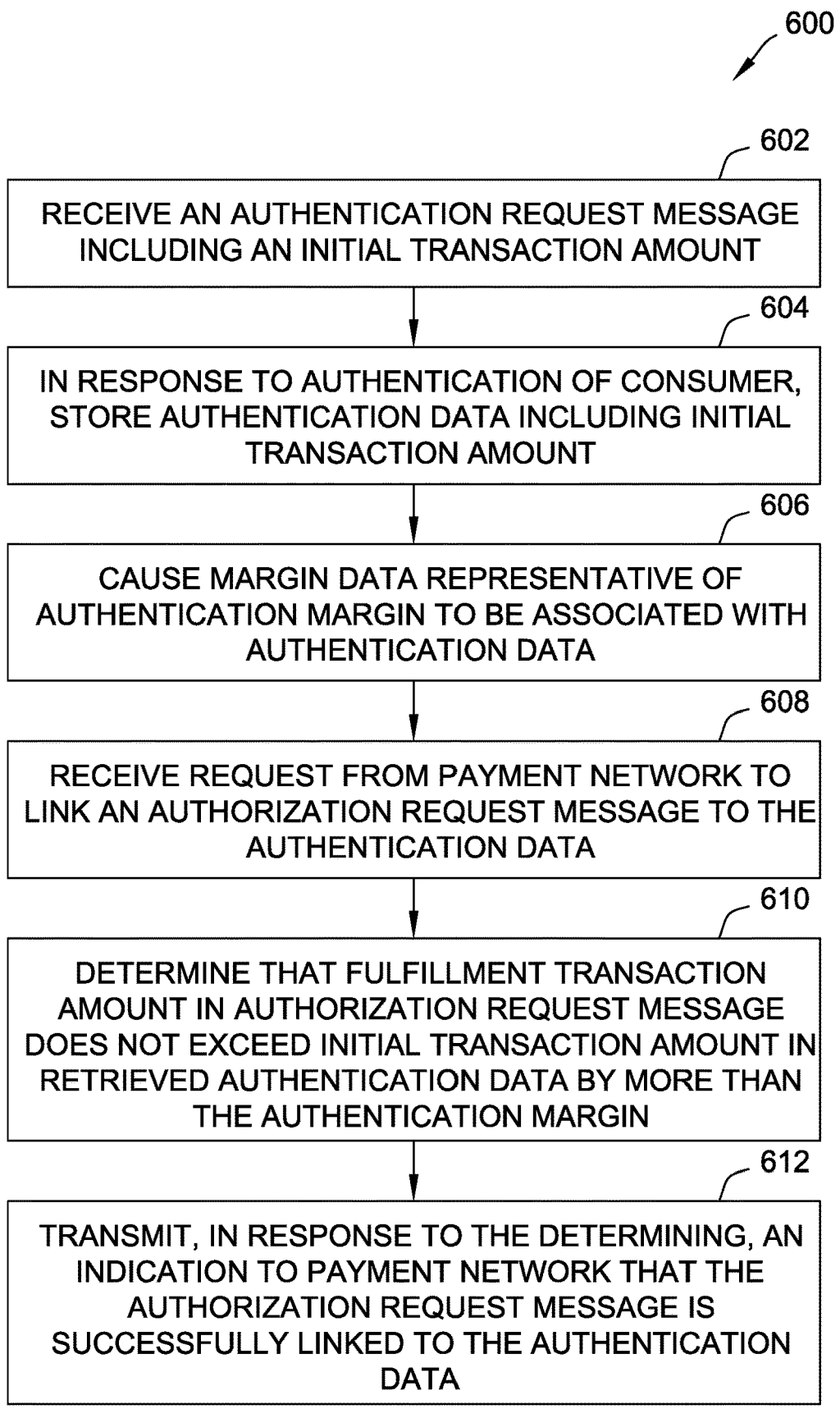

FIG. 6 is a flow diagram of an example method 600 for linking an initial authentication of an online transaction to a subsequent authorization of the online transaction. Method 600 may be implemented, for example, by one or more of directory server 110, ACS 116, or issuer computing device 118 (shown in FIG. 1). Method 600 includes receiving 602, from requestor server 106 in communication with merchant platform 104, and in response to initiation of the online transaction on the merchant platform 104, an authentication request message including transaction data, the transaction data including an initial transaction amount and an identifier of a proffered payment account. Method 600 also includes, in response to an authentication of the consumer as a legitimate holder of the proffered payment account, storing 604, in an authentication database, authentication data including the initial transaction amount, and causing 606 margin data representative of an authentication margin to be associated with the authentication data in the authentication database. Method 600 further includes receiving 608, from payment network 114, a request to link an authorization request message for the online transaction to the authentication data, the authorization request message including a fulfillment transaction amount greater than the initial transaction amount, and determining 610 that the fulfillment transaction amount does not exceed the initial transaction amount in the retrieved authentication data by more than the authentication margin. Additionally, method 600 includes transmitting 612, to the payment network in response to the determining, an indication that the authorization request message is successfully linked to the authentication data, thereby enabling authorization by the payment network 114 of the online transaction including the fulfillment transaction amount.

Method 600 may include different and/or additional steps consistent with the functionality of system 100 as described herein.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of passive multi-factor authentication. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A computer-implemented method for linking an initial authentication of an online transaction to a subsequent authorization of the online transaction, the method implemented by an authentication system including at least one processor in communication with a memory device, the method comprising steps performed by the at least one processor of:
   receiving, from a requestor server in communication with a merchant platform in response to initiation of the online transaction by a consumer using a consumer computing device to access the merchant platform, an authentication request message including transaction data, the transaction data including an initial transaction amount and an identifier of a proffered payment account;
   authenticating the consumer as a legitimate holder of the proffered payment account by comparing consumer authentication data received from the consumer computing device in response to accessing the merchant platform to stored authentication data;
   in response to authenticating the consumer, storing, in an authentication database, results of the comparison and the initial transaction amount;
   causing a user interface of the consumer computing device to display an option to store an authentication margin value for applying to the online transaction;
   linking, within the authentication database, margin data defining the authentication margin value inputted by the consumer via the user interface to the stored authentication data;
   receiving, from a payment network, a request to link an authorization request message for the online transaction to the stored authentication data, the authorization request message including a fulfillment transaction amount greater than the initial transaction amount;
   determining that the fulfillment transaction amount does not exceed the initial transaction amount in the stored authentication data by more than the authentication margin value; and
   transmitting, to the payment network in response to the determining, an indication that the authorization request message is successfully linked to the stored authentication data, the indication indicating to at least one of the payment network or an issuer of the proffered payment account to authorize the online transaction including the fulfillment transaction amount.

2. The computer-implemented method of claim 1, further comprising retrieving, from the authentication database, the stored authentication data by matching first data included in the authorization request message to second data included in a subsequent authorization request message.

3. The computer-implemented method of claim 1, wherein the authentication margin value includes at least one of a percentage-based margin value or a currency-based margin value.

4. The computer-implemented method of claim 1, further comprising retrieving contact information associated with the consumer computing device from an account database based on the identifier of the proffered payment account.

5. The computer-implemented method of claim 1, wherein the step of receiving the request to link the authorization request message occurs at least one day after the step of linking the margin data to the stored authentication data.

6. A computing system for linking an initial authentication of an online transaction to a subsequent authorization of the online transaction, the computing system comprising at least one processor in communication with a memory device, the computing system configured to:
   receive, from a requestor server in communication with a merchant platform in response to initiation of the online transaction by a consumer using a consumer computing device to access the merchant platform, an authentication request message including transaction data, the transaction data including an initial transaction amount and an identifier of a proffered payment account;
   authenticate the consumer as a legitimate holder of the proffered payment account by comparing consumer authentication data received from the consumer computing device in response to accessing the merchant platform to stored authentication data;
   in response to authenticating the consumer, store, in an authentication database, results of the comparison and the initial transaction amount;
   cause a user interface of the consumer computing device to display an option to store an authentication margin value for applying to the online transaction;
   link, by the at least one processor within the authentication database, margin data defining the authentication margin value inputter by the consumer via the user interface to the stored authentication data;
   receive, from a payment network, a request to link an authorization request message for the online transaction to the stored authentication data, the authorization request message including a fulfillment transaction amount greater than the initial transaction amount;
   determine that the fulfillment transaction amount does not exceed the initial transaction amount in the stored authentication data by more than the authentication margin value; and
   transmit an indication that the authorization request message is successfully linked to the stored authentication data, the indication indicating to at least one of the payment network or an issuer of the proffered payment account to authorize the online transaction including the fulfillment transaction amount.

7. The computing system of claim 6, wherein the at least one processor is further configured to retrieve, from the authentication database, the stored authentication data by matching first data included in the authorization request message to second data included in a subsequent authorization request message.

8. The computing system of claim 6, wherein the authentication margin value includes at least one of a percentage-based margin value or a currency-based margin value.

9. The computing system of claim 6, wherein the at least one processor is further configured to retrieve contact information associated with the consumer computing device from an account database based on the identifier of the proffered payment account.

10. The computing system of claim 6, wherein the at least one processor is further configured to link the margin data to the stored authentication data in the authentication database after receiving the request to link the authorization request message.

11. A non-transitory computer-readable storage medium having computer-executable instructions embodied thereon for linking an initial authentication of an online transaction to a subsequent authorization of the online transaction, wherein when executed by at least one computing device having a processor, the computer-executable instructions cause the processor to:
- receive, from a requestor server in communication with a merchant platform in response to initiation of the online transaction by a consumer using a consumer computing device to access the merchant platform, an authentication request message including transaction data, the transaction data including an initial transaction amount and an identifier of a proffered payment account;
- authenticate the consumer as a legitimate holder of the proffered payment account by comparing consumer authentication data received from the consumer computing device in response to accessing the merchant platform to stored authentication data;
- in response to authenticating the consumer, store, in an authentication database, results of the comparison and the initial transaction amount;
- cause a user interface of the consumer computing device to display an option to store an authentication margin value for applying to the online transaction;
- link, within the authentication database, margin data defining the authentication margin value inputted by the consumer via the user interface to the stored authentication data;
- receive, from a payment network, a request to link an authorization request message for the online transaction to the stored authentication data, the authorization request message including a fulfillment transaction amount greater than the initial transaction amount;
- determine that the fulfillment transaction amount does not exceed the initial transaction amount in the stored authentication data by more than the authentication margin value; and
- transmit, to the payment network in response to the determining, an indication that the authorization request message is successfully linked to the stored authentication data, the indication indicating to at least one of the payment network or an issuer of the proffered payment account to authorize the online transaction including the fulfillment transaction amount.

12. The computer-readable storage medium of claim 11, wherein the computer-executable instructions further cause the processor to retrieve, from the authentication database, the stored authentication data by matching first data included in the authorization request message to second data included in a subsequent authorization request message.

13. The computer-readable storage medium of claim 11, wherein the authentication margin value includes at least one of a percentage-based margin value or a currency-based margin value.

14. The computer-readable storage medium of claim 11 further cause the processor to retrieve contact information associated with the consumer computing device from an account database based on the identifier of the proffered payment account.

* * * * *